United States Patent
Reichelt et al.

(12)

(10) Patent No.: US 6,349,206 B1
(45) Date of Patent: Feb. 19, 2002

(54) METHOD, SYSTEM AND APPARATUS FOR PROVIDING A WARNING WHEN A MOBILE TERMINAL MAY LOSE SERVICE

(75) Inventors: Martin Reichelt, Plano; Inayat Syed, Richardson; Nauman Shakil, Plano, all of TX (US)

(73) Assignee: Ericsson INC, Research Triangle Park, NC (US)

( * ) Notice: Subject to any disclaimer, the term of this patent is extended or adjusted under 35 U.S.C. 154(b) by 0 days.

(21) Appl. No.: 09/223,630

(22) Filed: Dec. 30, 1998

(51) Int. Cl.[7] .................. H04M 11/00; H04Q 7/20
(52) U.S. Cl. ............... 455/421; 455/456; 455/435; 455/436
(58) Field of Search ................. 455/421, 456, 455/435, 436

(56) References Cited

U.S. PATENT DOCUMENTS 5,373,548 A * 12/1994 McCarthy ............... 455/421
5,787,354 A * 7/1998 Gray et al. .............. 455/421
5,832,363 A * 11/1998 Moriya et al. ........... 455/436
6,038,444 A * 3/2000 Schipper et al. ......... 455/421

* cited by examiner

Primary Examiner—Dwayne Bost
Assistant Examiner—Z. West
(74) Attorney, Agent, or Firm—Jenkens & Gilchrist, P.C.

(57) ABSTRACT

A method, system, and apparatus enables a subscriber to be warned via the mobile terminal (MT) when the MT has moved into an invalid area during a call. The network monitors the location/position of the MT during a call. When the MT enters a region (e.g., a cell) that is invalid because it is located within an invalid area, the network sends a message to the MT. The message may be, for example, a novel cause code in a Direct Transfer Application Part (DTAP) message that triggers a warning action by the MT when the network does not have access to the transmission reaching the MT. The message may alternatively be an announcement or tone sent directly to the MT when the network does have direct access to the transmission reaching the MT. The network also begins a timer. If the MT is returned to a valid area before the is timer expires, the call may be continued (and a message so indicating may optionally be sent to the MT from the network). Otherwise, the network disconnects the call at the expiration of the timer.

23 Claims, 9 Drawing Sheets

METHOD, SYSTEM AND APPARATUS FOR PROVIDING A WARNING WHEN A MOBILE TERMINAL MAY LOSE SERVICE

BACKGROUND OF THE INVENTION

1. Technical Field of the Invention

The present invention relates in general to the field of telecommunications, and in particular, to providing to a user of a mobile terminal (MT) in a wireless network system a warning indication prior to disconnection when the MT moves into an invalid area.

2. Description of Related Art

Mobile wireless communication is becoming increasingly important for providing safety, convenience, improved productivity, and simple conversational pleasure to subscribers of wireless communications services. One prominent mobile wireless communication option is cellular communication. Cellular phones, for instance, can be found in cars, briefcases, purses, and even pockets. With the proliferation of cellular phone use, cellular phone subscribers are demanding increased coverage areas and the ability to use their cellular phones across different geographical areas, types of wireless networks, wireless network service providers, etc. Regardless of attempts to provide seamless and transparent wireless service, however, subscribers eventually transport their MTs from a position that provides service to them and for their particular MT to a position that does not for, e.g., technical, economic, or political reasons.

Referring now to FIG. 1 of the drawings, an exemplary cellular wireless network, such as a Global System for Mobile Communication (GSM) Public Land Mobile Network (PLMN) 100, will be described. The PLMN 100 is composed of a plurality of areas 105, each with a Mobile Services Switching Center (MSC) 110 and an integrated Visitor Location Register (VLR) 115 therein. The MSC/VLR areas 105, in turn, include a plurality of Location Areas (LA) 120, which are defined as that part of a given MSC/VLR area 105 in which a Mobile Terminal (MT) 125 may move freely without having to send update location information to the MSC/VLR 110 that controls the LA 120. Each LA 120 is divided into a number of cells 130. The MT 125 is the physical equipment, e.g., a car phone, a computer with a wireless link, or other portable phone, used by mobile subscribers to communicate with the cellular network 100, each other, and users outside the subscribed network, both wireline and wireless.

The MSC 110 is in communication with at least one Base Station Controller (BSC) 135, which, in turn, is in contact with at least one Base Transceiver Station (BTS) 140. The BTS 140 is the physical equipment, illustrated for simplicity as a radio tower, that provides radio coverage to the geographical part of the cell 130 for which it is responsible. It should be understood that the BSC 135 may be connected to several BTSs 140, and may be implemented as a stand-alone node or integrated with the MSC 110. In either event, the BSC 135 and the BTS 140 components, as a whole, are generally referred to as a Base Station System (BSS) 145. It should be understood, however, that a BSS may alternatively be part of a satellite-based wireless network system.

With further reference to FIG. 1, the PLMN Service Area or wireless network 100 includes a Home Location Register (HLR) 150, which is a database maintaining all subscriber information, e.g., user profiles, current location information, International Mobile Subscriber Identity (IMSI) numbers, and other administrative information. The HLR 150 may be co-located with a given MSC 110, integrated with the MSC 110, or alternatively can service multiple MSCs 110, the latter of which is illustrated in FIG. 1.

The VLR 115 is a database containing information about all of the MTs 125 currently located within the MSC/VLR area 105. If an MT 125 roams into a new MSC/VLR area 105, the VLR 115 connected to that MSC 110 will request data about that MT 125 from the HLR database 150 (simultaneously informing the HLR 150 about the current location of the MT 125). Accordingly, if the user of the MT 125 then wants to make a call, the local VLR 115 will have the requisite identification information without having to reinterrogate the HLR 150. In the aforedescribed manner, the VLR and HLR databases 115 and 150, respectively, contain various subscriber information associated with a given MT 125.

As explained hereinabove, while mobile service subscribers desire and often expect to use their MT 125 at whatever position they are entering, the LA 120 or the cell 130 that they are approaching or entering may be an invalid service area for them. Furthermore, even when subscribers suspect that they may be nearing the edge of their valid territory(ies), they are usually unaware of the exact geographical boundary between a territory in which they have service and one in which they do not. Consequently, wireless service subscribers that are in motion may be unexpectedly disconnected from their call without knowing why.

SUMMARY OF THE INVENTION

The deficiencies of the prior art are overcome by the method and system of the present invention. For example, as heretofore unrecognized, it would be beneficial if subscribers could be informed that they have traveled into an invalid area where their call will be disconnected. In fact, it would be beneficial if subscribers could be informed that they have traveled into an invalid area prior to call disconnection to thereby enable the subscribers to return their MT to a valid area or to gracefully complete the conversation of a current call.

A method and system enables a subscriber to be warned via an MT when the MT has moved into an invalid area during a call. The network monitors the location (e.g., position) of the MT during a call. When the MT enters a region (e.g., a cell) that is invalid because the region is part of an invalid area, the network sends a message to the MT. The message may be, for example, a novel cause code in a Direct Transfer Application Part (DTAP) message that triggers production of a warning action stored in the MT when the network does not have access to the transmission being sent to the MT. The message may alternatively be an announcement or tone sent directly to the MT when the network does have direct access to the transmission being sent to the MT. The network also begins a timer. If the MT is returned to a valid area before the timer expires, the call may be continued. Otherwise, the network may disconnect the call at the expiration of the timer.

In one embodiment, the valid and invalid areas are segregated by LAs and cells. A LA may have, for example, all valid cells or a mixture of valid cells and invalid cells. When the MT initiates a call set-up, a network element (e.g., an MSC) (or a combination of network elements) determines whether the current LA of the MT includes only valid cells. If so, the network element requests to be updated only when the MT enters a new LA. If not, the network element requests to be updated when the MT enters a new cell. Entry into each new cell prompts the network element to determine whether the new cell is valid or invalid.

If the MT enters an invalid cell during a call, the network element begins a warning process. A timer is started, and the MT is caused to provide a warning to the subscriber. The warning may be, for example, an announcement or tone stored in the MT that is triggered when the network element sends a code. Alternatively, when the transmission path includes the network element, an announcement machine may send an announcement or tone directly to the MT.

If the subscriber returns the MT to a valid cell before the timer expires, then the call may continue. If the timer expires first, the network element initiates a call disconnection procedure. Advantageously, in accordance with the present invention, not only is the subscriber informed as to why a call is being disconnected (e.g., MT presence in an invalid area) should the disconnection not be avoided, but the subscriber is also given an opportunity to avoid the disconnection by returning to a valid area and may be informed that the call disconnection process has been avoided after returning to the valid area.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, software modules, techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, and software code are omitted so as not to obscure the description of the present invention with unnecessary detail.

A preferred embodiment of the present invention and its advantages are best understood by referring to FIGS. 1–7 of the drawings, like numerals being used for like and corresponding parts of the various drawings.

Aspects of the Global System for Mobile Communications (GSM) standard will be used to describe a preferred embodiment of the present invention. However, it should be understood that the principles of the present invention are applicable to other wireless communication standards (or systems), especially those in which an MT may travel from a valid area to an invalid area. The present invention is further applicable to satellite-based wireless networks, such as, e.g., a satellite-based GSM system.

Figure 1:
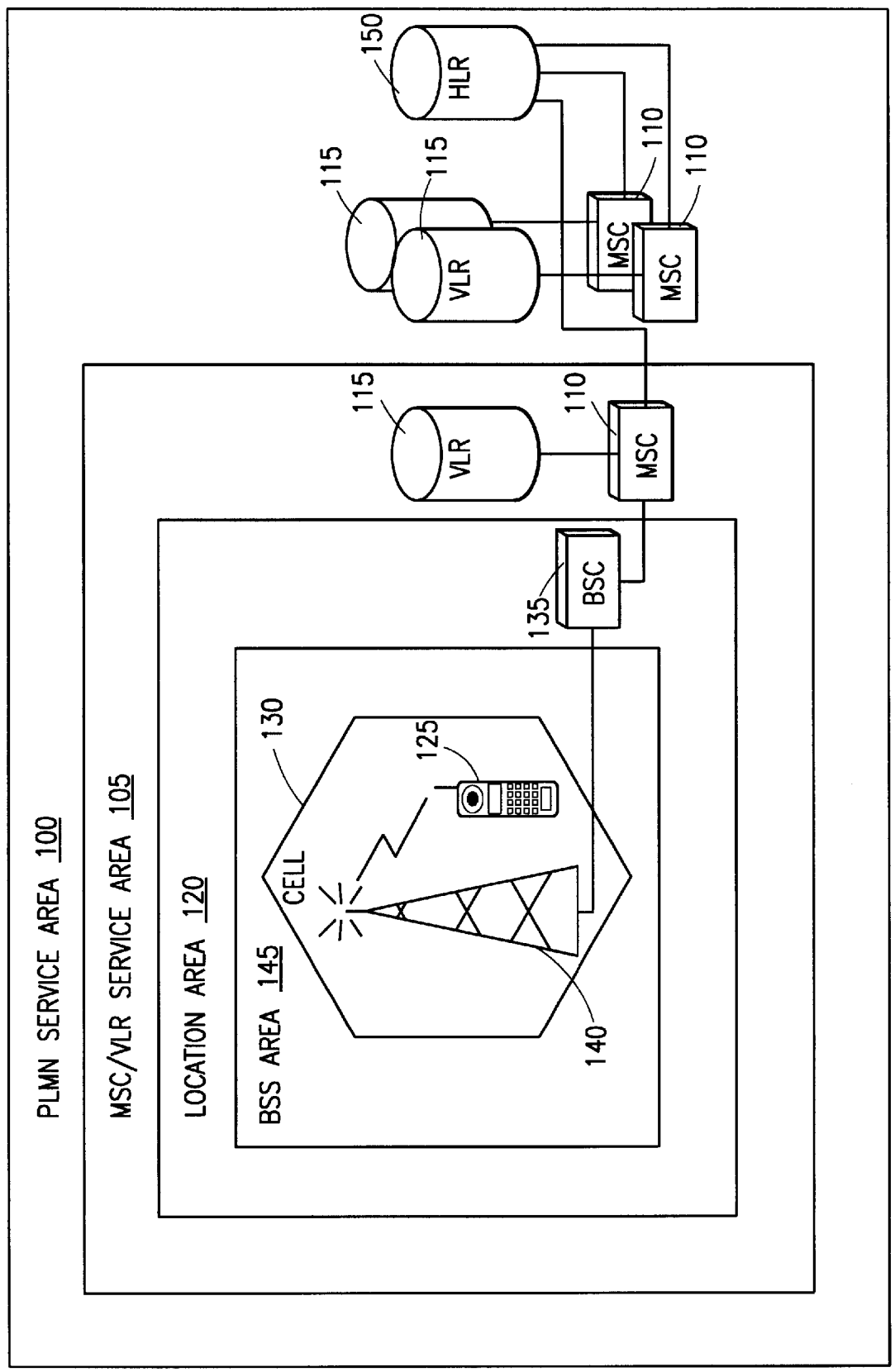
FIG. 1 illustrates an exemplary cellular wireless network, such as a Global System for Mobile Communication (GSM) Public Land Mobile Network (PLMN), in accordance with the present invention.
Figure 2:
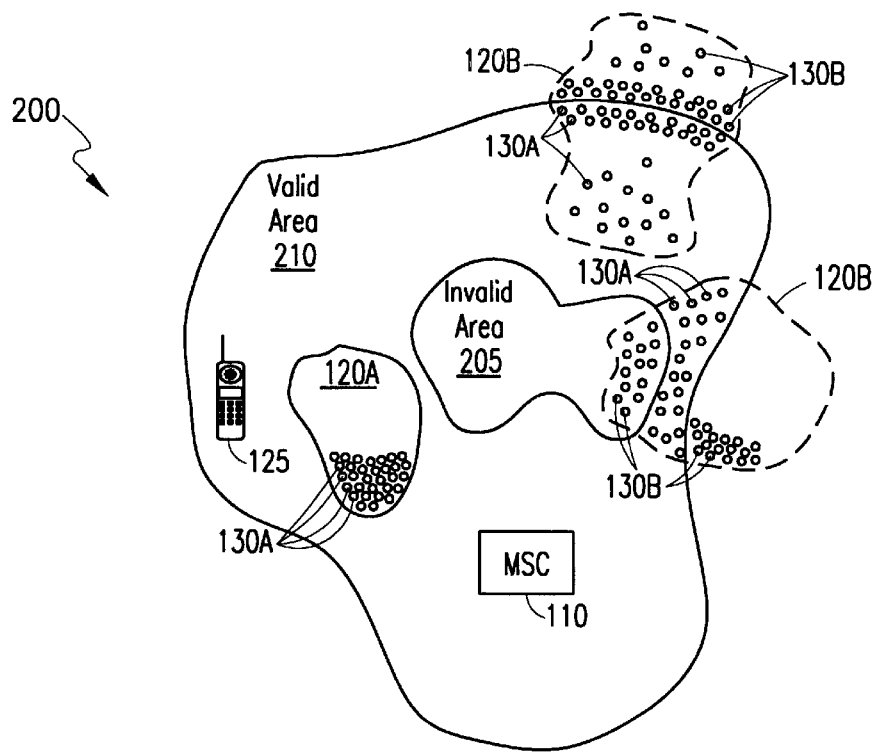
FIG. 2 illustrates an exemplary geographic service area having valid and invalid areas in accordance with the present invention.

Referring now to FIG. 2, an exemplary geographic service area having valid and invalid areas in accordance with the present invention is illustrated generally at 200. A valid area 210 is adjacent to, and may be surrounded by, an invalid area 205. The valid area 210 is also shown to enclose another invalid area 205. The valid area 210 includes at least one MSC 110, and an MT 125 is also shown within the valid area 210. The geographic service area 200 includes multiple LAs 120 (e.g., LAs 120A and 12B), which are represented by the dashed-line closed curves. Each LA 120 may include one or more cells 130 (e.g., cells 130A and 130B). The LAs 120 are illustrated, by way of example only, as being entirely within the valid area 210 or being partially within the valid area 210 and partially within one or more of the invalid areas 205.

The cells 130 of the LAs 120 are further divided into cells 130A and cells 130B. The cells 130A may be considered valid cells because they are within the valid area 210. The cells 130B, on the other hand, may be considered invalid cells because they are within the invalid areas 205. For purposes of describing certain exemplary and optional aspects of the present invention, the LAs 120 that do not include an invalid cell 130B are referenced by "120A", and the LAs 120 that do include an invalid cell 130B are referenced by "120B". Hence, an MT 125 that is engaged in a call might have entered or might be entering one of the invalid cells 130B when it is entering, or is already in, one of the LAs 120B that contains an invalid cell 130B.

Advantageously, in accordance with the present invention, the position/location of the MT 125 may be constantly and/or periodically monitored by the MSC 110 in order to detect movement of the MT 125 into an invalid cell 130B (e.g., during a call). In one particularly efficient embodiment, the MSC 110 only monitors the movements of the MT 125 from one cell 130 to another cell 130 when the MT 125 is entering, or is already in, one of the LAs 120B that contains an invalid cell 130B. It should be understood that segregating invalid areas from valid areas at the cell level is by way of example only, for any region that may be defined in some manner may be used to delineate invalid areas from valid areas (and vice versa).

Figure 3A:
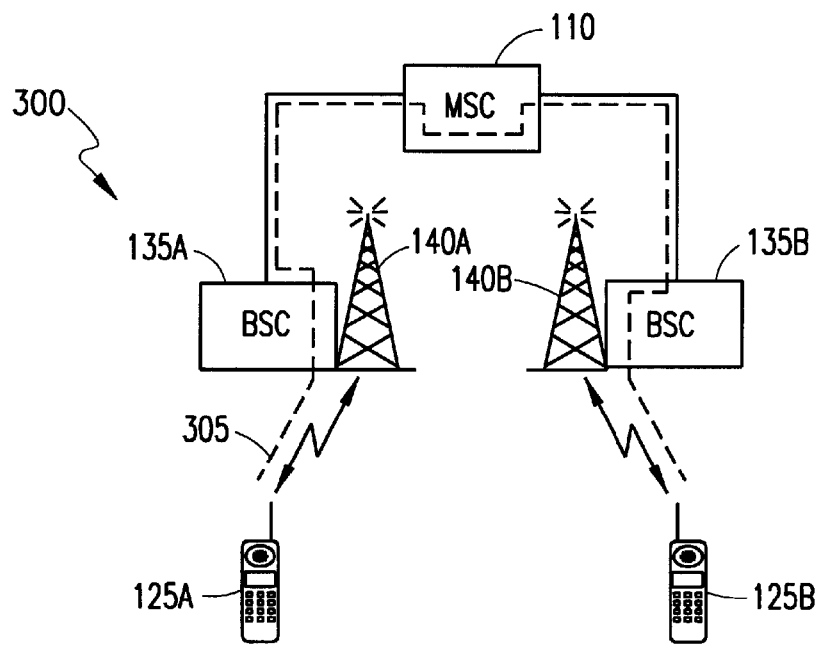
FIG. 3A illustrates an exemplary wireless network system with an identified transmission path in accordance with the present invention.

Referring now to FIG. 3A, an exemplary wireless network system with an identified transmission path in accordance with the present invention is illustrated generally at 300. A BSC 135A and a BTS 140A are connected to the MSC 110. The MSC 110 is also connected to a BSC 135B and a BTS 140B. An MT 125A is in wireless communication with the BTS 140A, and an MT 125B is in wireless communication with the BTS 140B. A transmission 305 (e.g., which may include, for example, speech, data, etc.), which is represented by a dashed line, shows a transmission path (e.g., as distinguished from a signaling path) between the MT 125A and the MT 125B that includes the MSC 110. The signaling/message transmission for providing to an MT an invalid position warning may vary in certain embodiments of the present invention in dependence on whether the path of the transmission is routed through an MSC, as is explained further hereinbelow.

Figure 3B:
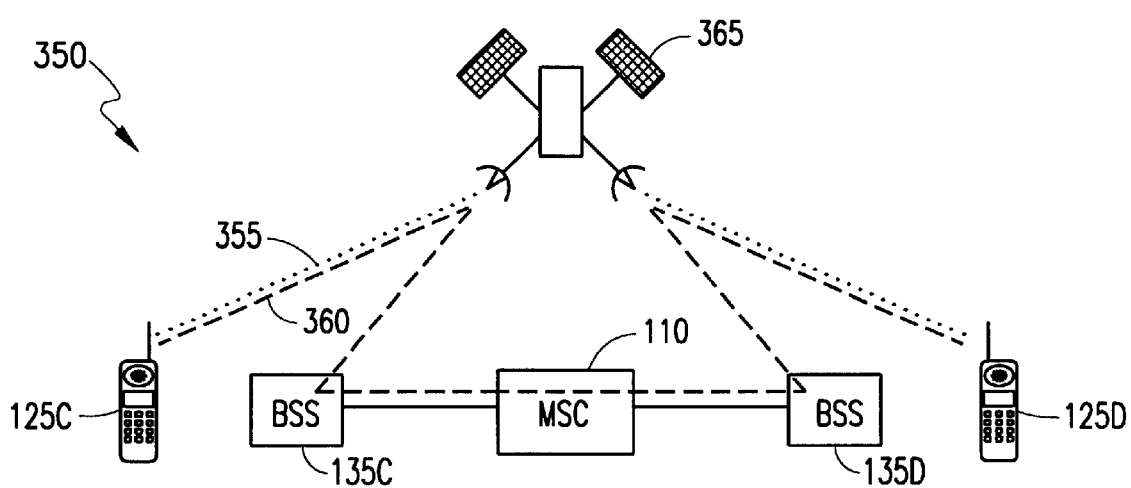
FIG. 3B illustrates an exemplary satellite-based wireless network system with two identified transmission paths in accordance with the present invention.

Referring now to FIG. 3B, an exemplary satellite-based wireless network system with two identified transmission paths in accordance with the present invention is illustrated generally at 350. As stated hereinabove, the principles of the present invention are also applicable to satellite-based wireless network systems. An MT 125C is in communication with an MT 125D via a satellite 365. The satellite-based wireless network system 350 also includes a satellite BSS 135C connected to an MSC 110, which is also connected to a satellite BSS 135D.

A transmission 355, which is represented by a dotted line, shows a transmission path between the MT 125C and the MT 125D that does not include the MSC 110 (e.g., a single hop in the satellite-based wireless network system 350). On the other hand, a transmission 360, which is represented by a dashed line, shows a transmission path between the MT 125C and the MT 125D that does include the MSC 110 (e.g., a double hop in the satellite-based wireless network system 350). As is explained in greater detail hereinbelow, the signaling/message transmission for providing to an MT an invalid position warning may vary in certain embodiments of the present invention in dependence on whether the path of the transmission is routed through an MSC in satellite-based wireless network systems as well. It should therefore be understood that the wireless service regions within the valid and invalid areas 210 and 205 may be formed using satellite beams.

Figure 4A:
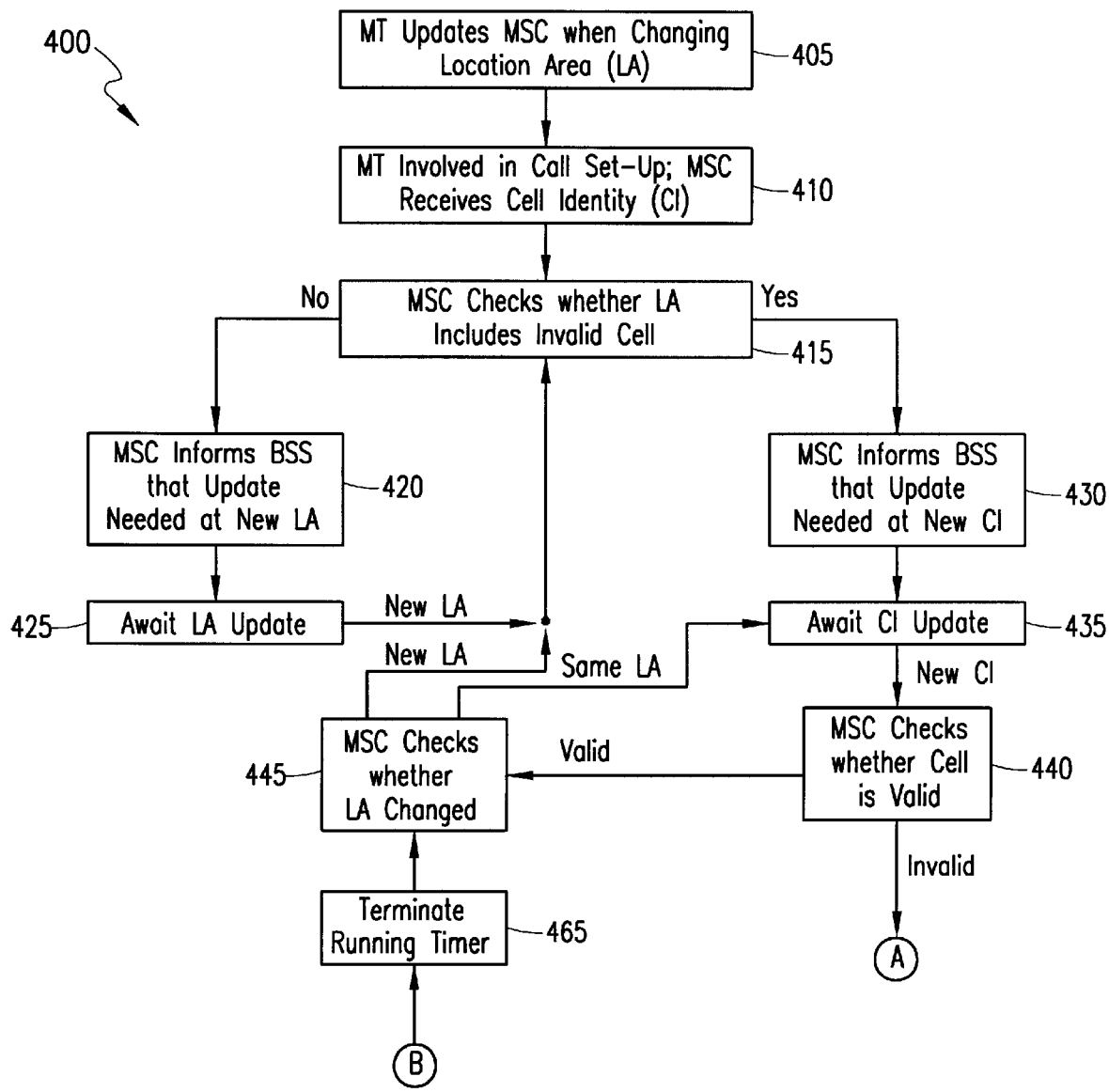
FIG. 4A illustrates a first portion of a method in flowchart form for providing an invalid position warning to an MT in accordance with the present invention.
Figure 4B:
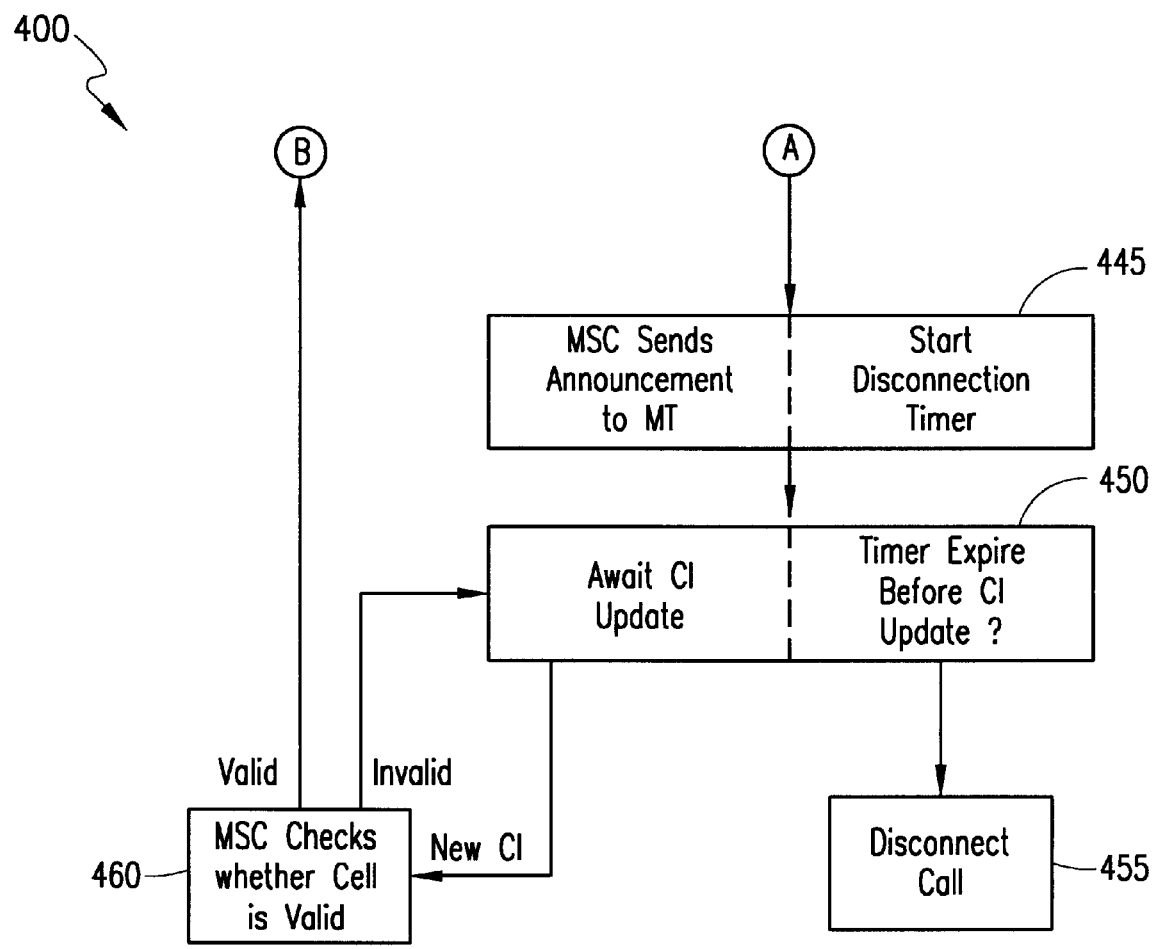
FIG. 4B illustrates a second portion of a method in flowchart form for providing an invalid position warning to an MT in accordance with the present invention.

Referring now to FIGS. 4A and 4B, a first and a second portion, respectively, of a method in flowchart form for providing an invalid position warning to an MT in accordance with the present invention is illustrated generally at 400. At a 'LocationUpdatingRequest' (LUR) (MT to network), the MSC receives the LA Identification (ID) of the LA in which the MT is currently located (block 405). The MT sends LUR when entering a new LA only if it is not involved in a call. Once the MT is involved in a call, the MSC will not receive any further updates regarding the position of the MT. During the call set-up for the MT, the MSC receives information (e.g., a cell identity (CI)) regarding the cell in which the MT is currently located (block 410). According to the principles of the present invention, the MSC may receive updates regarding the position of the MT during a call as well.

A geographic service area (e.g., the valid area 210 and the invalid area 205) is divided into geographical locations that are identified over 'location information'/'position information'. The location information may be based, for example, on cells (CI or cell global identity (CGI)), on LAs, on regions defined using geographical coordinates (e.g., a region could be defined as a set of edges in which each edge is defined by two geographical coordinates), etc. By way of example only, the geographical locations of the relevant service area(s) are based on cells (CIs) and LAs in an exemplary embodiment, such as, e.g., in the service area 200.

Once the location information framework (e.g., the nature of valid and invalid regions) is established, the MSC can request that the BSS send an indication to the MSC whenever the location information of the MT changes. The MSC may subsequently determine whether or not the new location information is allowed or disallowed for this MT. If disallowed, the MSC will take appropriate action(s) to respond to the location violation, as explained in an exemplary embodiment below. As an example, the MSC may play an announcement or tone to the subscriber (e.g., warning of impending disconnection because of invalid position) and then start a timer. Upon expiration of the timer (e.g., if the MSC has not been informed that the MT has since moved to a position that is valid), the MSC may disconnect the call. If there is no transmission path between the MSC and the MT (e.g., only a signaling path is present), an announcement or tone stored in the MT may be triggered by the MSC via the signaling link (e.g., by sending a novel progress indicator in the progress message). Alternatively, a written message (e.g., a Short Message Service (SMS) message along with a tone) providing a warning of impending disconnection, possibly in conjunction with an explanation of how the disconnection may be avoided, may be sent. Other techniques for communicating information (e.g., the warning of invalid position/location and/or of impending disconnection) to the subscriber through the MT are within the scope of the present invention.

In one exemplary embodiment in which the regions for defining valid and invalid locations include LAs and cells (e.g., the service area 200 of FIG. 2 and related descriptive text), the MSC 110 stores for each cell 130 (or any general region specified) an indication as to whether or not the cell 130 is valid (e.g., cells 130A) or invalid (e.g., cells 130B) and for every LA 120 an indication as to whether it contains one or more invalid cells (e.g., LAs 120B) or does not contain one or more invalid cells (e.g., LAs 120A). This storage may be organized, for example, into any general data structure (e.g., a list, a database, etc.) and stored in general-purpose memory (e.g., volatile, non-volatile, etc.).

Continuing now with FIGS. 4A and 4B, at the set-up for a call, the MSC 110 determines whether (e.g. checks if) the current LA 120 contains only valid cells 130A. In other words, the MSC 110 checks whether the LA 120 that the MT 125 is within includes an invalid cell 130B (decision block 415). If not, the MSC 110 informs the serving BSS (not shown in FIG. 2) that a position update need only be provided each time the MT 125 enters a new LA 120 (block 420). The MSC 110 is then in a waiting condition (at least with respect to the MT 125) for a LA update (block 425). When a LA update occurs, the method checks whether the (new) LA includes an invalid cell 130B (decision block 415). If so, the MSC 110 informs the serving BSS that a position update should be provided each time the MT 125 enters a new cell 130 (block 430). The position update may be provided in the form of the CI of the new cell 130. The MSC 110 is then in a waiting condition (at least with respect to the MT 125) for a CI update (block 435). When a CI update occurs, the method checks whether the (new) cell 130 is a valid cell 130A (decision block 440). This valid/invalid cell determination may be accomplished by comparing the received CI with a database that includes each relevant cell/CI in the system along with a corresponding indication of valid/invalid status.

If the (new) cell 130 is a valid cell 130A, the MSC 110 determines whether the LA 120 has changed (decision block 445). If so (the LA 120 is new), then the method returns to decision block 415. If not (the LA 120 is the same), then the method again awaits a CI update (block 435). If the (new) cell 130 is an invalid cell 130B (as determined at decision block 440), the MSC 110 may perform one or more functions (block 445 (of FIG. 4B)). First, the MSC 110 causes the MT 125 to notify the subscriber (not shown) that the MT 125 has entered an invalid cell 130B. This notification may be effectuated in any of several ways (as described in greater detail hereinabove), such as, e.g., sending an announcement or tone to the MT 125. Second (also at block 445), the MSC 110 may start a disconnection timer. It should be noted that a different network element/node (e.g., the BSS) may instead start a timer.

Subsequently, the MSC 110 enters a waiting period (at least with respect to the MT 125) (decision block 450). The waiting period corresponds to the established duration of the (disconnection) timer. The MSC 110 is waiting for a CI update. If the MSC 110 does not receive a CI update before the timer expires (e.g., a countdown timer reaches zero, a count up timer reaches a preselected time, etc.), the call is disconnected (block 455) because the MT 125 is still within the invalid cell 130B. If, on the other hand, the MSC 110 does receive a CI update (e.g., a new CI) before the timer expires, the MSC checks whether the (new) cell 130 is a valid cell 130A (decision block 460). If not (e.g., the new cell 130 is an invalid cell 130B), then the method returns to the decision block 450 to continue waiting for, e.g., either the expiration of the timer or another CI update. It should be noted that if another network element/node (e.g., a BSS) starts the timer, then that network element/node may determine when the timer expires and thereafter initiate the disconnection.

If the MSC 110 determines that the (new) cell 130 is a valid cell 130A (at decision block 460), then the timer started by the MSC 110 (or other network element/node) may be terminated (block 465). The timer may be terminated because the MT 125 has reentered the valid area 210. Advantageously, the present invention has thus provided to the subscriber of the MT 125 an opportunity to return to the valid area 210 after entering an invalid area 205 without having a currently active call disconnected. After the timer has been terminated (block 465), the MSC 110 checks whether the LA 120 has changed as a result of entering a new cell (block 445), as explained hereinabove.

In an alternative embodiment, the MSC 110 additionally causes the MT 125 to notify (e.g., provide an announcement and/or tone (e.g., directly through a transmission path or indirectly by sending a code along a signaling path) to) the subscriber informing the subscriber that the MT 125 has reentered the valid area 210. The notification may optionally specifically relate that the call is no longer in danger of being disconnected. This notification may be sent, for example, before, during, or after the termination of the running timer (of block 465).

It should be understood that the regional units explicitly shown in the service area 200 and recited in the flowchart 400 and related explanatory text (e.g., the LAs and cells) are exemplary only. Any general regional unit recognizable or definable within a wireless network may be used therefor. Furthermore, the two-level update aspect (e.g., the LA update (block 425) and the CI update (block 435)) is optional. Each new region, for example, entered into by the MT may be checked for valid/invalid status by the wireless network system without regard to the status of a larger region or unit.

Furthermore, it should be noted that certain nodes and geographical designations within the exemplary wireless network (e.g., such as the MSC, BSS, LA, and cell) are described herein with specificity in order to clarify and clearly explain the principles of the present invention. However, the present invention is also applicable to network nodes and geographical areas in general. Furthermore, although hand-held phones are specifically illustrated as the MTs in the FIGURES, the principles of the present invention are applicable to MTs in general. MTs may also include, for example, computers with a wireless link, car phones, personal digital assistants (PDAs) with a wireless link, etc.

Figure 5A:
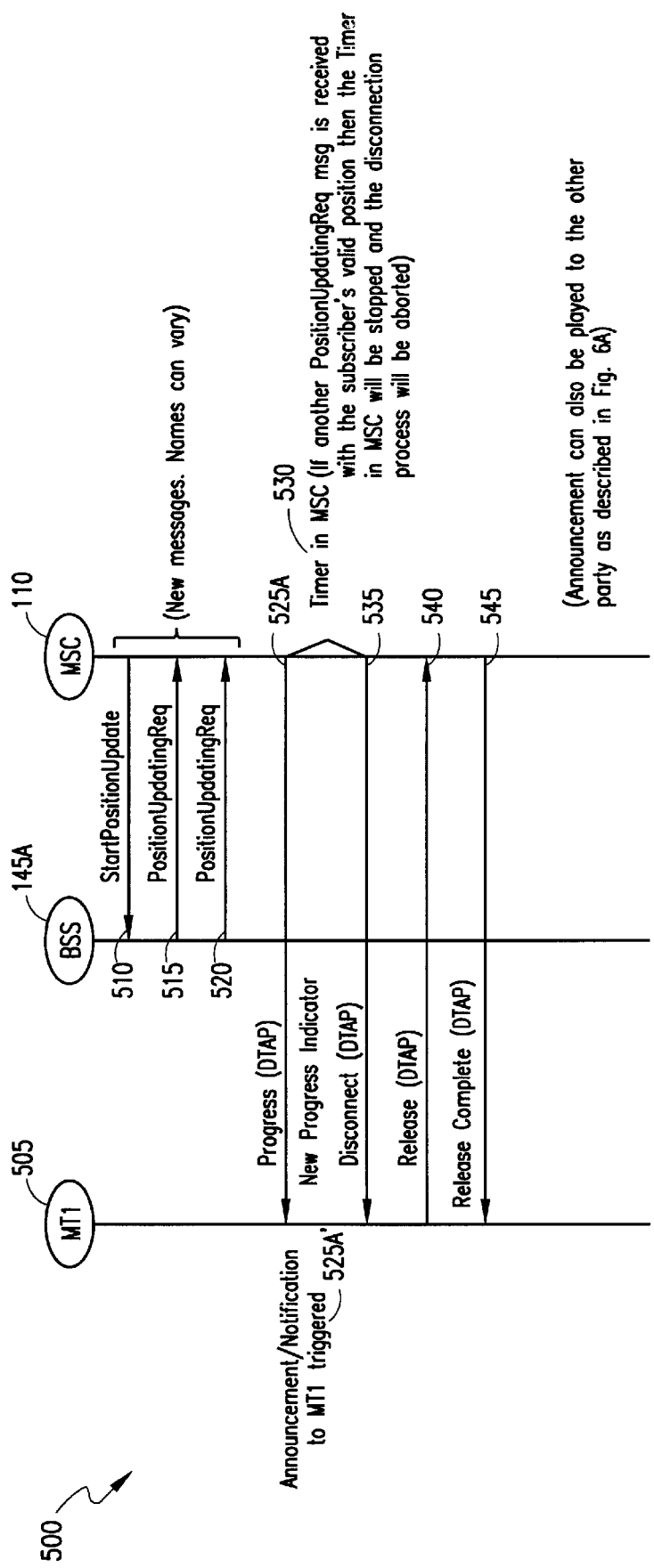
FIG. 5A illustrates an exemplary wireless system sequence diagram with an invalid warning mechanism in an MSC and no transmission path through the MSC in accordance with the present invention.
Figure 5B:
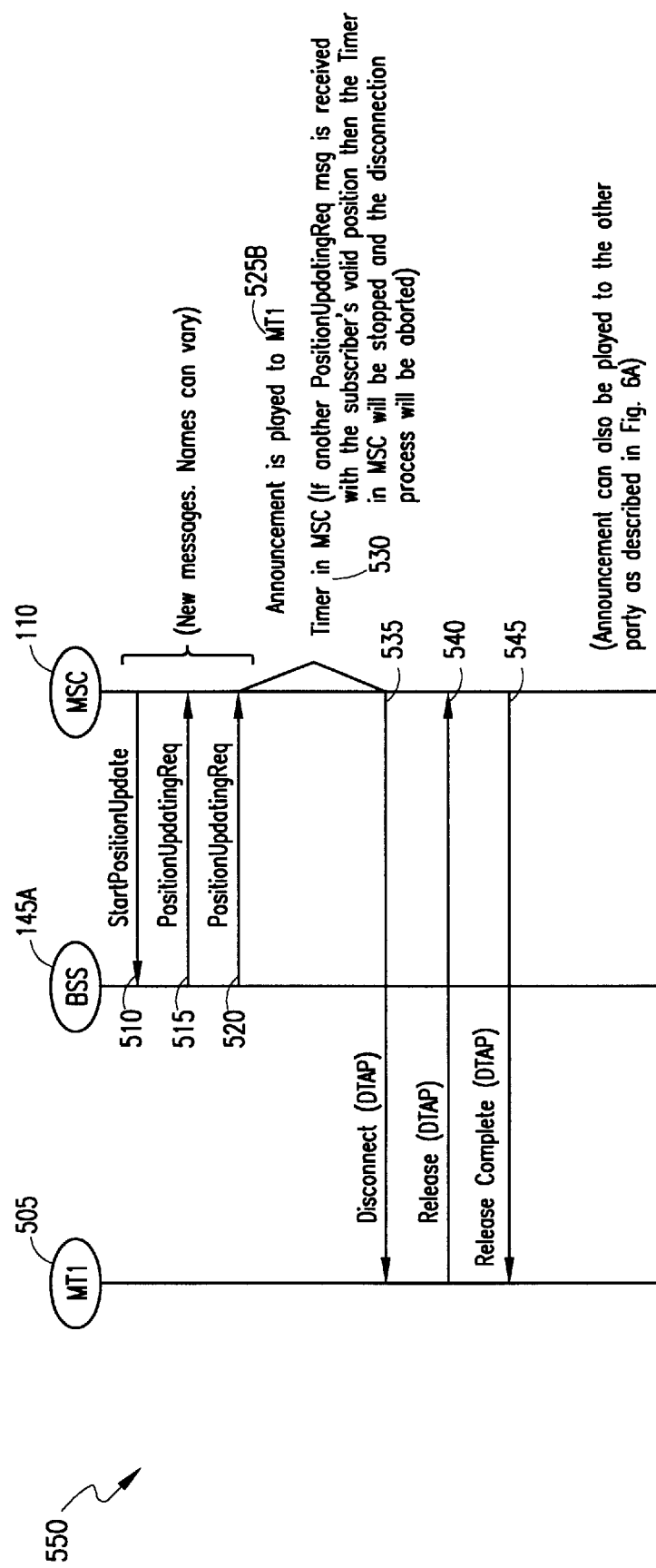
FIG. 5B illustrates an exemplary wireless system sequence diagram with an invalid warning mechanism in an MSC and a transmission path through the MSC in accordance with the present invention.

Referring now to FIGS. 5A and 5B, exemplary wireless system sequence diagrams in accordance with the present invention are illustrated at 500 and 550, respectively. Specifically, FIG. 5A illustrates an exemplary wireless system sequence diagram with an invalid warning mechanism in an MSC and no transmission path through the MSC in accordance with the present invention at 500, and FIG. 5B illustrates an exemplary wireless system sequence diagram with an invalid warning mechanism in an MSC and a transmission path through the MSC in accordance with the present invention at 550. The sequence diagrams 500 and 550 illustrate the passage of messages between (or among) the MSC 110, a BSS 145A, and an MT1 505. In FIG. 5A, there is no transmission path between the MSC 110 and the MT1 505. In FIG. 5B, on the other hand, there is a transmission path between the MSC 110 and the MT1 505.

When the MSC 110 determines that the MT1 505 is engaged in a call and is in (or is entering) a LA 120A that does not include an invalid cell 130B, the MSC 110 sends to the BSS 145A a 'StartPositionUpdate' message (510) with an indication that the MSC 110 needs to be informed when the MT1 505 moves to another LA 120. But if the current LA 120B does contain an invalid cell 130B, the message 'StartPositionUpdate' (510) is sent towards the BSS 145A with an indication that the MSC 110 needs to be informed when the MT1 505 moves to another cell 130. Depending on the requested granularity (LA 120 or cell 130), every time the MT1 505 enters a new LA 120/cell 130, the BSS 145A will inform the MSC 110 about the new location using the message 'PositionUpdatingRequest' (515 and 520). It should be noted that the messages 'StartPositionUpdate' (510) and 'PositionUpdatingRequest', (515 and 520) are novel and that their names may consequently vary.

Upon reception of the message 'PositionUpdatingRequest', the MSC 110 will handle the following cases:

(a) The MT1 505 has moved to a new LA 120:

The MSC 110 again performs a check as to whether or not the new LA 120 contains an invalid cell. If so, the granularity of the position updates will be requested to be changed to "cell" using the message 'StartPositionUpdate'.

(b) The MT1 505 has moved to a new cell 130:

(1) The cell 130 is an invalid cell 130B:

If no transmission path exists (e.g., FIG. 5A), the MSC 110 sends a 'Progress' DTAP message (525A) with a novel progress indicator to the MT1 505 to trigger an announcement or other notification stored within the MT1 505 (525A'). If a transmission path exists (e.g., FIG. 5B), the MSC 110 starts an announcement or tone (525B) towards the MT1 505 indicating that the call will be disconnected unless the MT1 505 returns to a valid location (e.g., before expiration of a timer).

The MSC 110 also will start a timer T1 (530). If another 'PositionUpdatingRequest' message is received with a valid location for the MT1 505, then the MSC 110 ceases the disconnection process and cancels the timer T1. The MSC 110 may also provide notification via the MT1 505 that the call will not be disconnected (e.g., in the same manner as the invalid area notification may be provided). However, upon expiration of the timer T1, the MSC 110 will release the call (e.g., according to standard GSM procedures). The call may be released according to a 'Disconnect' (DTAP) message (535), a 'Release' (DTAP) message (540), and a 'Release Complete' (DTAP) message (545) as exchanged between the MSC 110 and the MT1 505.

(2) The cell 130 is a valid cell 130A:

The MSC 110 first checks if the timer T1 is running. If so, the timer T1 is stopped, and the call is not disconnected. The MSC 110 further checks if the cell 130A is within the same LA 120 as the previous cell 130 that the subscriber camped on. If not, and if the new LA 120 does not contain any invalid cells 130B, the MSC 110 requests to change the granularity of the position updates to "LA" using the message 'StartPositionUpdate'.

Figure 6A:
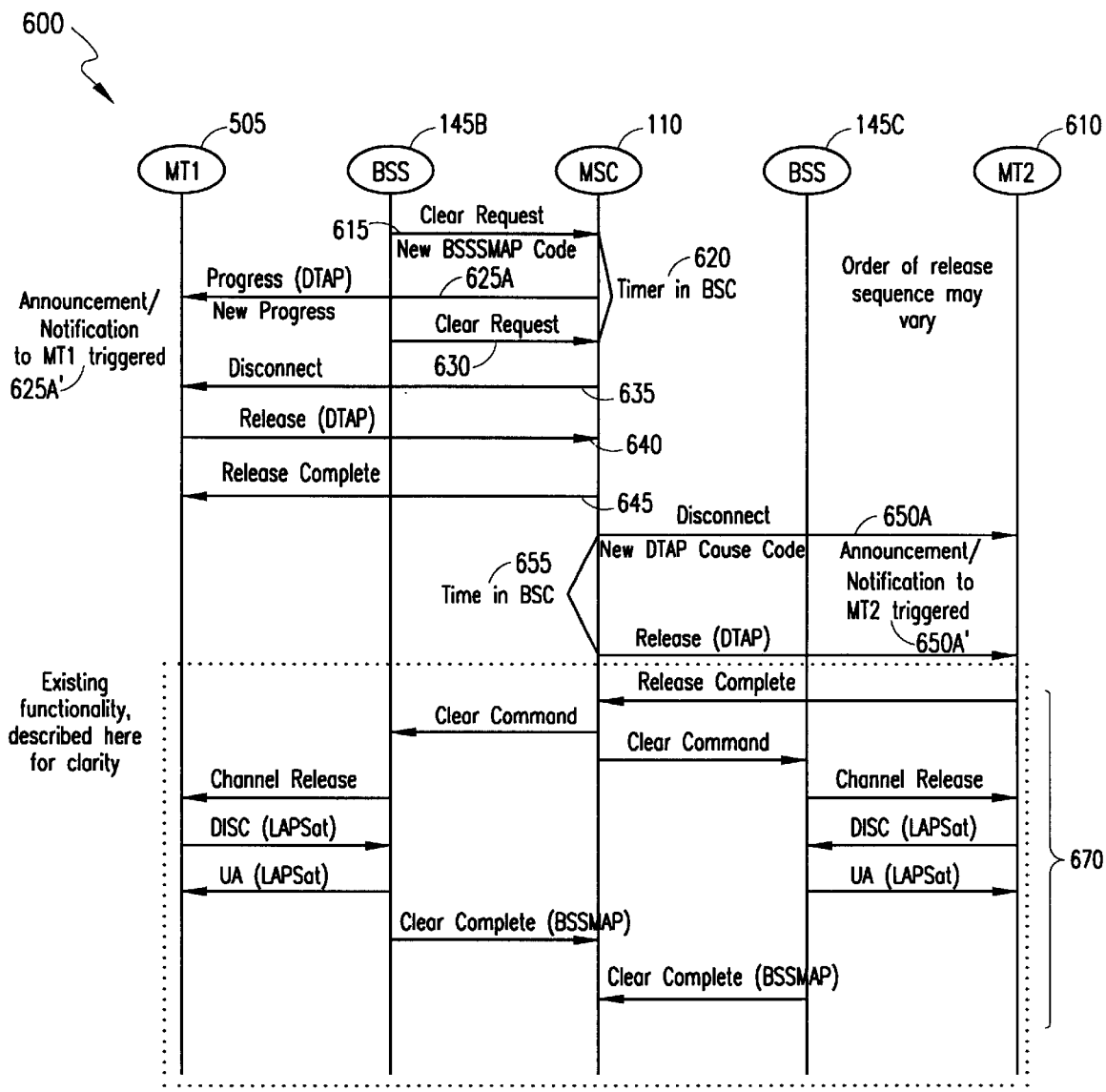
FIG. 6A illustrates an exemplary wireless system sequence diagram with an invalid warning mechanism in a BSS and no transmission path through an MSC in accordance with the present invention.
Figure 6B:
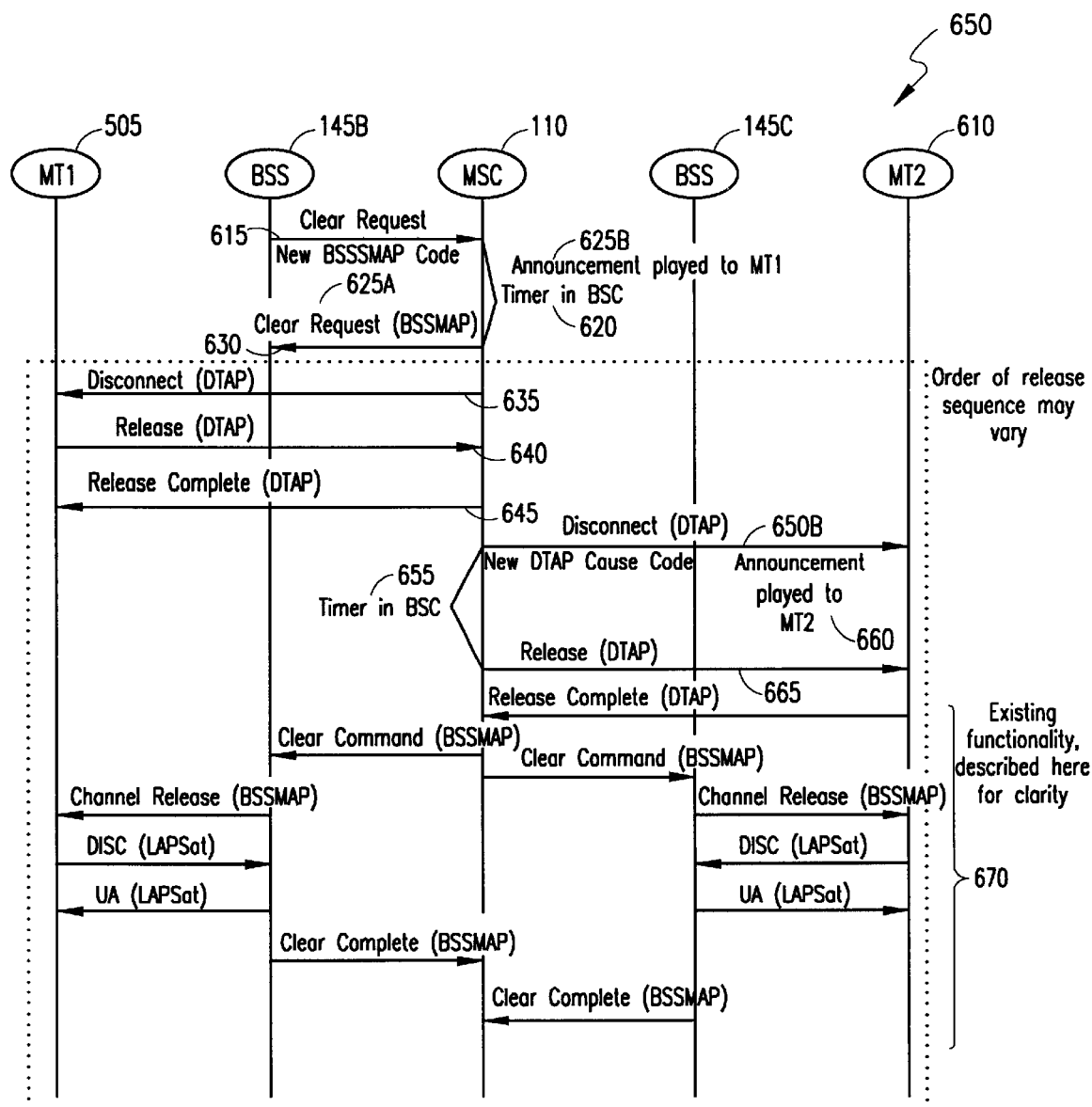
FIG. 6B illustrates an exemplary wireless system sequence diagram with an invalid warning mechanism in a BSS and a transmission path through an MSC in accordance with the present invention.

Referring now to FIGS. 6A and 6B, exemplary wireless system sequence diagrams in accordance with the present invention are illustrated at 600 and 650, respectively. Specifically, FIG. 6A illustrates an exemplary wireless system sequence diagram with an invalid warning mechanism in a BSS and no transmission path through an MSC in accordance with the present invention at 600, and FIG. 6B illustrates an exemplary wireless system sequence diagram with an invalid warning mechanism in a BSS and a transmission path through an MSC in accordance with the present invention at 650. The sequence diagrams 600 and 650 illustrate the passage of messages between (or among) the MSC 110, a BSS 145B, a BSS 145C, an MT1 605, and an MT2 610. In FIG. 6A, there is no transmission path between the MSC 110 and the MT1 605 or the MT2 610. In FIG. 6B, on the other hand, there is a transmission path between the MSC 110 and the MT1 605 and the MT2 610.

When the BSS 145 determines (or is informed) that the MT1 605 is within an invalid region (e.g., an invalid cell 130B), a 'ClearRequest' message is sent to the MSC 110 along with a novel BSS Management Application Part (BSSMAP) code (615). A timer T1 is started in the corresponding BSC (not shown in FIGS. 6A and 6B) (620). As stated hereinabove, the monitoring, the timing, the disconnection initiation processes, etc. may occur in any convenient node (or combination of nodes) depending on the relevant wireless standard and/or wireless network. If no transmission path exists (e.g., FIG. 6A), the MSC 110 may then send a 'Progress' (DTAP) message (625A) to the MT1 605 with a novel progress indicator in order to trigger an announcement, tone, or other notification stored within the MT1 605 (625A'). If a transmission path does exist (e.g., FIG. 6B), the MSC 110 may play an announcement or tone directly to the MT1 605 (625B)

If the MT1 605 returns to a valid area before the expiration of the timer T1, the timer T1 is terminated. The MSC 110 may also so notify the user via the MT1 605. If the timer T1 expires prior to the BSC receiving an indication that the MT1 605 has returned to a valid region (e.g., a valid cell 130A), the BSS 145B sends a second 'ClearRequest' message (630) to the MSC 110. The message exchange between the MSC 110 and the MT1 605 continues with a 'Disconnect' (DTAP) message 635, a 'Release' (DTAP) message 640, and a 'ReleaseComplete' (DTAP) message 645.

The MSC 110 also disconnects the MT2 610. The MSC 110 sends a 'Disconnect' (DTAP) message (650A or 650B) to the MT2 610. If no transmission path exists (e.g., FIG. 6A), the MSC 110 includes a novel (DTAP) cause code in the 'Disconnect' message (650A) to the MT2 610 in order to trigger an announcement, tone, or other notification stored within the MT2 610 (650A'). The MSC also starts a timer T2 (655). If a transmission path does exist (e.g., FIG. 6B), the MSC 110 may play an announcement or tone (660) directly to the MT2 610 during the timer T2, but after the 'Disconnect' (DTAP) message (650B). When the timer T2 expires, the MSC 110 sends a 'Release' (DTAP) message 665 to the MT2 610. The MSC 110, the BSS 145B, the BSS 145C, the MT1 605, and the MT2 610 thereafter exchange messages (670) to release the logical and physical channels for subsequent use, as is known in the art.

It should be noted that flowchart 400 (of FIGS. 4A and 4B) is directed primarily to an embodiment in which an MSC controls the invalid area determination and call disconnection mechanism (e.g., as shown and described in FIGS. 5A and 5B and related text) according to the present invention. However, one of ordinary skill in the art could readily modify and/or extend the flowchart 400 to be directed to other embodiments, such as, e.g., an embodiment in which a BSS controls the invalid area determination and call disconnection mechanism (e.g., as shown and described in FIGS. 6A and 6B and related text), after reading and understanding the principles of the present invention. By way of example only, and not of limitation, blocks 415, 420, 425, 430, 435, 440, and 445 may be effectuated by and/or within a BSS. With such a modification/extension of the flowchart 400, the BSS advantageously includes a data structure (or at least access thereto) delineating invalid areas from valid areas.

Figure 7:
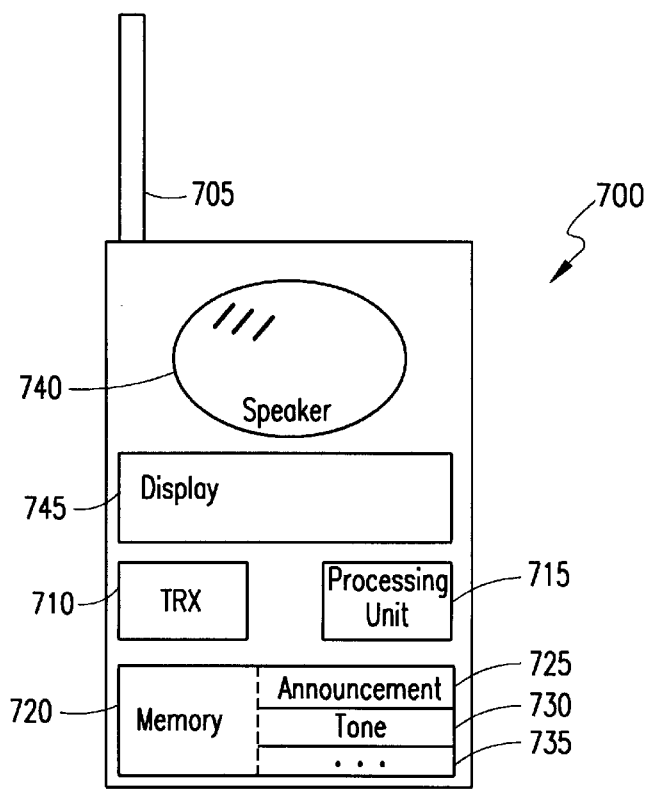
FIG. 7 illustrates an exemplary mobile terminal (MT) in accordance with the present invention.

Referring now to FIG. 7, an exemplary MT in accordance with the present invention is illustrated at 700. The MT 700 includes an antenna 705 in electrical communication with a transceiver 710 for receiving, demodulating, etc. messages from a wireless network system. A processing unit 715 operates in accordance with software, hardware, firmware, etc. to decode received messages and extract, for example, an invalid position warning code included in a message (e.g., the novel progress indicator included in the 'Progress' (DTAP) message 525A (of FIG. 5A)) received from the wireless network system. Responsive to reception (e.g., and extraction) of the invalid position warning code, the processing unit, in conjunction with executable code for example, accesses a memory 720 to retrieve an announcement 725, a tone 730, and/or another warning (e.g., a text message) 735 from the memory 720. The MT 700 may then provide the warning to the subscriber via, for example, a speaker 740 (e.g., if the warning is the announcement 725 and/or the tone 730) or a display 745 (e.g., if the warning is a text message). The MT 700 may also provide any combination of such warnings.

Although preferred embodiments) of the method, system, and apparatus of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for providing a warning of invalid position to a user of a mobile terminal, comprising the steps of:
   determining whether said mobile terminal is located at an invalid position during an ongoing call;
   sending a message to said mobile terminal responsive to a determination that said mobile terminal is located at an invalid position;
   providing an invalid position indication to the user at said mobile terminal responsive to said message;
   starting a timer responsive to the determination that said mobile terminal is located at an invalid position;
   receiving a regional identifier, the regional identifier including indicia regarding at least one of a valid status and an invalid status for a new position into which said mobile terminals has entered;
   determining whether said mobile terminal has returned to a valid position;
   terminating said timer responsive to reception of the regional identifier, said regional identifier corresponding to a valid position into which said mobile terminal has entered;
   allowing the ongoing call to continue;
   sending another message to said mobile terminal responsive to the determination that said mobile terminal has returned to said valid position; and
   providing a valid position indication to the user at said mobile terminal responsive to said another message.

2. The method according to claim 1, wherein said step of sending a message to said mobile terminal further comprises the step of sending at least one of an announcement and a tone to said mobile terminal and said step of providing an invalid position indication to the user at said mobile terminal further comprises the step of playing said at least one of an announcement and a tone to the user at said mobile terminal.

3. The method according to claim 1, wherein said step of sending a message to said mobile terminal further comprises the step of sending a code to said mobile terminal and said step of providing an invalid position indication to the user at said mobile terminal further comprises the step of playing at least one of an announcement and a tone stored in said mobile terminal to the user at said mobile terminal.

4. The method according to claim 1, wherein said step of determining whether said mobile terminal is located at an invalid position further comprises the step of receiving a region identifier for a region in which said mobile terminal is located.

5. The method according to claim 4, wherein said step of determining whether said mobile terminal is located at an invalid position further comprises the step of comparing said region identifier to at least one entry in a data structure, said data structure including indicia regarding at least one of a valid status and an invalid status for each of a plurality of regions.

6. The method according to claim 1, further comprising the step of disconnecting the ongoing call that includes said mobile terminal responsive to expiration if said timer.

7. The method according to claim 1, further comprising the steps of:
   receiving a first regional identifier corresponding to a first larger region;
   determining whether said first larger region includes at least one smaller invalid region;
   requesting a position update when said mobile terminal enters a second larger region, responsive to a determination that said first larger region does not include at least one smaller invalid region; and
   requesting a position update whenever said mobile terminal enters a smaller region, responsive to a determination that said first larger region does include at least one smaller invalid region.

8. The method according to claim 1, further comprising the step of:
   receiving a regional identifier that corresponds to an invalid region; and
   wherein said step of determining whether said mobile terminal is located at an invalid position further comprises the step of determining that said mobile terminal is located at an invalid position responsive to receiving said regional identifier that corresponds to said invalid region.

9. A system for a wireless communications network for providing a warning of invalid position to a user of a mobile terminal, comprising;
   means for determining whether said mobile terminal is located at an invalid position during an ongoing call;
   means for sending a message to said mobile terminal responsive to a determination that said mobile terminal is located at an invalid position;
   means for providing an invalid position indication to the user at said mobile terminal responsive to said message;
   means for starting a timer responsive to the determination that said mobile terminal is located at an invalid position;
   means for receiving a regional identifier, the regional identifier including indicia regarding at least one of a valid status and an invalid status for a new position into which said mobile terminals has entered;
   means for determining whether said mobile terminal has returned to a valid position;
   means for terminating said timer responsive to reception of the regional identifier, said regional identifier corresponding to a valid position into which said mobile terminals has entered;
   means for allowing the ongoing call to continue;
   means for sending another message to said mobile terminal responsive to the determination that said mobile terminals has returned to said valid position; and
   means for providing a valid position to the user at said mobile terminal responsive to said another message.

10. The system according to claim 9, wherein said means for sending a message to said mobile terminal comprises means for sending at least one of an announcement and a tone to said mobile terminal and said means for providing an invalid position indication to the user at said mobile terminal comprises means for playing said at least one of an announcement and a tone to the user at said mobile terminal.

11. The system according to claim 9, wherein said means for sending a message to said mobile terminal comprises means for sending a code to said mobile terminal and said means for providing an invalid position indication to the user at said mobile terminal comprises means for playing at least one of an announcement and a tone store in said mobile terminal to the user at said mobile terminal.

12. The system according to claim 9, wherein said means for determining whether said mobile terminal is located at an invalid position comprises means for receiving a region identifier for a region in which said mobile terminal is located.

13. The system according to claim 12, wherein said means for determining whether said mobile terminal is located at an invalid position comprises means for comparing said region identifier to at least one entry in a data structure, said data structure including indicia regarding at least one of a valid status and an invalid status for each of a plurality of regions.

14. The system according to claim 9, further comprising means for disconnecting the ongoing call that includes said mobile terminal responsive to expiration of said timer.

15. The system according to claim 9, further comprising:
means for receiving a first regional identifier corresponding to a first larger region;
means for determining whether said first larger region includes at least one smaller invalid region;
means for requesting a position update when said mobile terminal enters a second larger region, responsive to a determination that said first larger region does not include at least one smaller invalid region; and
means for requesting a position update whenever said mobile terminal enters a smaller region, responsive to a determination that said first larger region does include at least one smaller invalid region.

16. The system according to claim 9, further comprising:
means for receiving a regional identifier that corresponds to an invalid region; and
wherein said means for determining whether said mobile terminal is located at an invalid position comprises means for determining that said mobile terminal is located at an invalid position responsive to receiving said regional identifier that corresponds to said invalid region.

17. The system according to claim 9, wherein said means for determining whether said mobile terminal is located at an invalid position and said means for sending a message to said mobile terminal are associated with one or more nodes in said wireless communications network and said means for providing an invalid position indication to the user at said mobile terminal is associated with said mobile terminal.

18. A mobile terminal for use in a wireless network system that provides a warning of invalid position to a user of said mobile terminal, comprising:
a memory, said memory storing an invalid position indication, said invalid position indication comprising at least one of a tone, an announcement, and a text message;
means for receiving a first message from the wireless network, said message including a first code;
means for providing said invalid position indication to the user responsive to said first code, said means for providing said invalid position indication operatively connected to said memory and said means for receiving a first message;
means for receiving a second message from the wireless network, said message including a second code;
means for providing said invalid position indication to the user responsive to said second code, said means for providing said invalid position indication operatively connected to said memory and said means for receiving a second message; and
wherein the first message and second message may be received directly when the wireless network does not have direct access to the transmission being sent to the mobile terminal.

19. The mobile terminal according to claim 18, wherein the first message is a 'Progress'Direct Transfer Application Part (DTAP) message.

20. The mobile terminal according to claim 19, wherein the first code in the 'Progress' DTAP message is a progress indicator which triggers at least one of the tone, the announcement, or the text message stored in memory.

21. The mobile terminal according to claim 18, wherein the second code in the second message is a DTAP cause code which triggers at least one of the tone, the announcement, or the text message stored in memory.

22. A mobile terminal for use in a wireless network system that provides a warning of invalid position to a user of said mobile terminal, comprising:
a memory, said memory storing an invalid position indication, said invalid position indication comprising at least one of a tone, an announcement, and a text message;
means for receiving a first message from the wireless network, said message including a first code;
means for providing said invalid position indication to the user responsive to said first code, said means for providing said invalid position indication operatively connected to said memory and said means for receiving a first message;
means for receiving a second message from the wireless network, said message including a second code;
means for providing said invalid position indication to the user responsive to said second code, said means for providing said invalid position indication operatively connected to said memory and said means for receiving a second message; and
wherein the first code is a Base Station System (BSS) Management Application Part (BSSMAP) code.

23. A mobile terminal for use in a wireless network system that provides a warning of invalid position to a user of said mobile terminal, comprising:
a memory, said memory storing an invalid position indication, said invalid position indication comprising at least one of a tone, an announcement, and a text message;
means for receiving a first message from the wireless network, said message including a first code;
means for providing said invalid position indication to the user responsive to said first code, said means for providing said invalid position indication operatively connected to said memory and said means for receiving a first message;
means for receiving a second message from the wireless network, said message including a second code;
means for providing said invalid position indication to the user responsive to said second code, said means for providing said invalid position indication operatively connected to said memory and said means for receiving a second message; and
wherein the second message is a 'Disconnect' DTAP message if the mobile terminal does not enter a valid position before a timer expires, otherwise, the timer is terminated and the second message is a 'Progress' DTAP message.

* * * * *

UNITED STATES PATENT AND TRADEMARK OFFICE
CERTIFICATE OF CORRECTION

PATENT NO.    : 6,349,206 B1   Page 1 of 1
DATED         : February 19, 2002
INVENTOR(S)   : Reichelt et al.

It is certified that error appears in the above-identified patent and that said Letters Patent is hereby corrected as shown below:

<u>Title page,</u>
Item [57], ABSTRACT
Line 15, delete "is"

<u>Column 4,</u>
Line 40, replace "12B" with -- 120B --

<u>Column 6,</u>
Line 51, replace "(e. g." with -- (e.g., --

<u>Column 9,</u>
Lines 41, 43, 45, 47, 58, 60, 62, 65 and 67, repalce "605" with -- 505 --

<u>Column 10,</u>
Line 3 and 19, replace "605" with -- 505 --
Line 61, replace "embodiments)" with -- embodiment (s) --

<u>Column 11,</u>
Line 19, replace "terminals" with -- terminal --

<u>Column 12,</u>
Line 20, replace "comprising;" with -- comprising: --
Lines 35, 42 and 46, replace "terminals" with -- terminal --
Line 47, replace "position" with -- position indication --
Line 61, replace "store" with -- stored --

Signed and Sealed this

Third Day of September, 2002

Attest:

Attesting Officer

JAMES E. ROGAN
*Director of the United States Patent and Trademark Office*